United States Patent

Havas et al.

[15] 3,664,942

[45] May 23, 1972

[54] END POINT DETECTION METHOD AND APPARATUS FOR SPUTTER ETCHING

[72] Inventors: Janos Havas; John S. Lechaton, both of Wappingers Falls, N.Y.

[73] Assignee: International Business Machines Corporation, Armonk, N.Y.

[22] Filed: Dec. 31, 1970

[21] Appl. No.: 103,045

[52] U.S. Cl. ..........................204/192, 204/298, 250/83.3 H
[51] Int. Cl. .......................................................C23c 15/00
[58] Field of Search .......................204/192, 298; 250/83.3 H

[56] References Cited

UNITED STATES PATENTS

| | | | |
|---|---|---|---|
| 3,334,228 | 8/1967 | Mattson | 204/192 |
| 3,395,090 | 7/1968 | Meckel | 204/192 |
| 3,474,021 | 10/1969 | Davidse et al. | 204/192 |

*Primary Examiner*—G. L. Kaplan
*Assistant Examiner*—Sidney S. Kanter
*Attorney*—Hanifin & Jancin and John A. Jordan

[57] ABSTRACT

The end point in sputter-etching metal layers, for example, from substrates is determined by employing a silicon, quartz, or the like, monitor control wafer in the sputter-etching environment which wafer has been previously coated with said metal, for example, in the same run as that used to fabricate the workpiece substrate. Thus, the monitor control wafer exhibits the same thickness of metal, or the like, as the thickness of the metal layer to be selectively sputter-etched from the substrate. The temperature exhibited by the monitor control wafer during the sputter-etching material removal process in monitored by an infrared radiation thermometer, by way of a quartz window. When the layer of metal, or the like, has been removed from the monitor control wafer, the temperature, as sensed by the infrared radiation thermometer during sputter-etching, declines thereby indicating the end point in the removal process of the metal layer, or the like.

27 Claims, 3 Drawing Figures

INVENTORS
JANOS HAVAS
JOHN S. LECHATON

BY John A. Jordan
ATTORNEY

END POINT DETECTION METHOD AND APPARATUS FOR SPUTTER ETCHING

BACKGROUND OF THE INVENTION

The present invention relates to a detector arrangement, and more particularly, to a method and apparatus for detecting the end point in a sputter-etching process.

In the fabrication of semiconductor devices, for example, removal of layers, or portions of layers, of materials, such as metal, and the like, by sputter-etching requires a method and apparatus for optimally and accurately determining at what point completion of the desired removal of the material is achieved without an unnecessarily protracted, and possibly detrimental or undesirable sputter-etching time. For example, in the formation of interconnecting metal lands for integrated circuits, by sputter-etching, the complete removal of metal in those areas, between the lands, that are not masked, is essential to the production of an ultimately effective and useful device.

It is clear that the end point in the sputter-etching removal process may be determined by visual observation. However, such an approach is difficult and costly to effect, inefficient, inaccurate and, obviously, operator dependent. Accordingly, such approach has been found highly inadequate. Other approaches are obviously available for determining the end point in an etching process. However, none have been found to be satisfactorily applicable to an effective determination of the end point of a sputter-etching process. Such a process, it is clear, requires an effective, simple and accurate approach to determining the end point.

SUMMARY OF THE INVENTION

In accordance with the principles of the present invention, the problems that prevail in efforts to obtain an effective, simple and accurate approach to determining end point in a sputter-etching process are effectively overcome by employing an infrared radiation thermometer, external to the sputtering chamber, to sense the temperature change exhibited by a monitor control wafer, within said chamber, said monitor control wafer within said chamber comprising, for example, layers of different material with the thickness of its layer to be sputter-etched being the same as the thickness of the layer to be sputter-etched from the substrate workpiece, undergoing the material removal process.

More specifically, an infrared radiation thermometer is employed, external to a sputtering chamber, to monitor, via a quartz window, the temperature changes exhibited by a monitor control wafer undergoing material removal by sputter-etching in the same chamber, along with the workpiece, likewise undergoing material removal by the sputter-etching process. Since the monitor control wafer may be fabricated, in situ, in the same run as the workpiece, the layer of material to be removed, therefrom may precisely be of the same thickness as the layer of material to be removed from the workpiece. When the material to be sputter-etched from the monitor control wafer is completely removed, the infrared radiation thermometer senses a temperature change. Thus, where a metal film, such as Cr-Ag-Cr, evaporated on a quartz substrate undergoes sputter-etching in accordance with the present invention, then, when the same film of metal on the corresponding monitor control wafer has been completely sputter-etched, a temperature change is observed, which change is followed by a temperature characteristic that levels off to a constant value, indicative of the temperature exhibited by the cathode pedestal plate of the sputtering apparatus, in thermally conductive relationship with the remaining quartz disk.

It is therefore an object of the present invention to provide an improved detection apparatus.

It is a further object of the present invention to provide a detection apparatus for determining the end point in a material removal process.

It is yet a further object of the present invention to provide an improved method and apparatus for determining the end point of a sputter-etching process.

It is still yet a further object of the present invention to provide an improved arrangement for determining the end point in removing a layer of material from a substrate, or the like, by sputter- etching.

DETAILED DESCRIPTION OF THE INVENTION

Figures 1, 2:
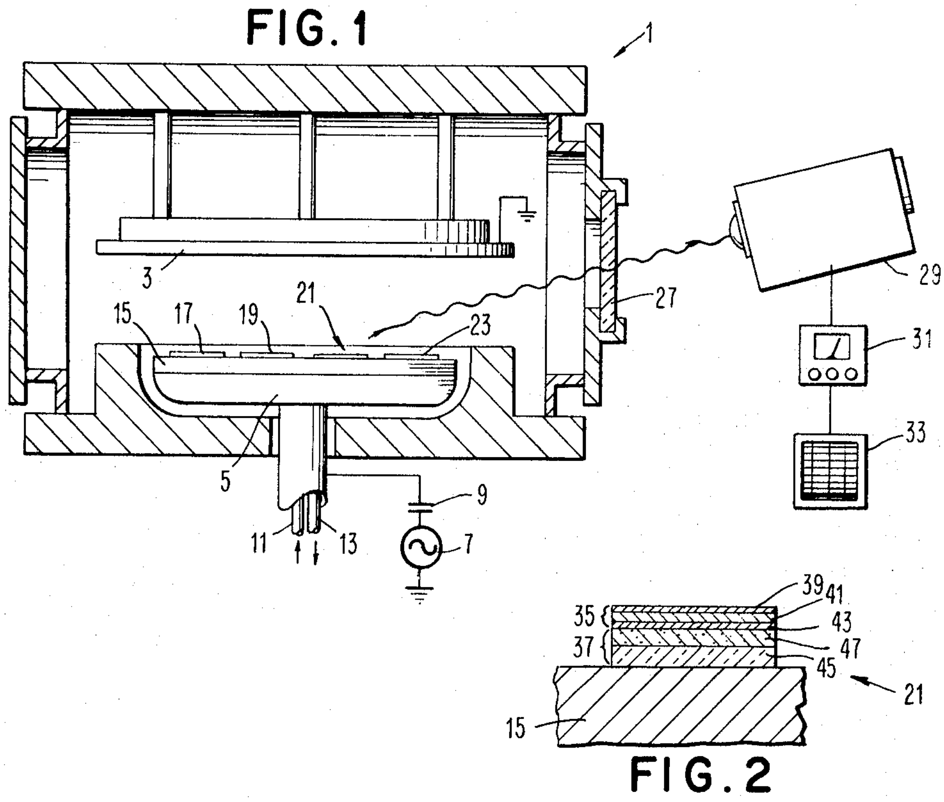
FIG. 1 shows a preferred embodiment of an arrangement exemplary of those that may be employed in carrying out the method, in accordance with the principles of the present invention.
FIG. 2 shows an enlarged view of a control wafer exemplary of those that may be employed in the arrangement of FIG. 1.

In the preferred arrangement, shown in FIG. 1, there is depicted a conventional sputtering chamber 1, employed for the purposes of conventional RF sputter-etching. Anode 3 is shown grounded, while cathode 5 is coupled to an RF source 7, via capacitor 9, the latter of which acts to provide a dc bias for the cathode. Typically, cathode 5 may be a water cooled arrangement whereby cooled water enters at port 11 and exits at port 13, as shown by the arrows depicted thereat.

As shown in FIG. 1, cathode plate 15, positioned on cathode 5, is arranged to support an array of workpieces. Typically, the workpieces may comprise, for example, a plurality of wafer-type workpieces, depicted by reference characters 17, 19, and 23, which workpieces are positioned in spaced apart relationship upon cathode plate 15, the latter being in conductive contact with cathode 5. Also positioned on cathode plate 15 is monitor control wafer 21, which wafer acts to provide an indication of the end point of sputter-etching, in accordance with the principles of the present invention. It should be clear that although only three workpieces have been shown in sputtering chamber 1, any of a variety of workpieces, existing in any reasonable number, and arranged in any manner, may be subjected to sputter-etching, in accordance with the principles of the present invention. Accordingly, cathode plate 15 may, for example, be fabricated to exhibit rows and columns of raised portions or plateaus, whereby an array of workpieces is formed by positioning wafers on the respective raised portions. It should also be clear that any of a variety of patterns may be sputter-etched into the various workpieces by employing the appropriate mask arrangements required to produce the selective sputter-etching, necessary to produce the desired results.

It is to be understood that the various workpieces 17, 19, and 23 of FIG. 1 are merely illustrative of workpieces in general and are not intended to represent, or be limited to, a particular workpiece. Likewise, monitor control wafer 21, in FIG. 1, is merely depictive of a general monitor control wafer that may be employed. An exemplary embodiment of a particular control wafer is shown in FIG. 2, to be explained more fully hereinafter. It should further be generally understood here that although reference is made, in the embodiment of FIG. 2, to removal of metal, other types of material can likewise be removed by the end point detector process, in accordance with the principles of the present invention. Accordingly, a layer of insulator, for example, may be removed from a substrate support layer of semiconductor material. Alternatively, workpieces 17, 19, and 23, as depicted in FIG. 1 may, for example, each comprise a layer of Cr-Ag-Cr on a semiconductor substrate, which arrangement would then, as will be seen hereinafter, correspond to an exemplary materials arrangement for the monitor control wafer embodiment, shown in FIG. 2. According to such a scheme, the Cr-Ag-Cr layer could be selectively sputter-etched, in accordance with the pattern of the mask used, until the semiconductor substrate layer is reached.

It should be noted, here, that in the workpiece arrangement shown in FIG. 1, the particular mask or masks normally used to save the metal lands, for example, on the various workpieces from undergoing sputter-etching, have not been shown, since such are not considered essential to a clear understanding of the principles of the present invention. It should also be noted, here, in regard to the arrangement shown in FIG. 1, that the particular location of the monitor control wafer is not significant. Thus, in this latter regard, it is only necessary that the monitor control wafer be positioned in such a manner that the emission therefrom is detectable by the detecting apparatus employed.

It should be appreciated, here, that a metal layer on a semiconductor substrate, such as quartz or silicon, as described above, for example, typically provides a marked contrast in emissivity, and therefore temperature, during sputter-etching, when the metal has been removed from the substrate and the substrate is thereby exposed. It should be emphasized, however, that the process of the present invention may be employed with any two materials, so long as there is a discernible change in emissivity in going from one material to the other.

As shown in FIG. 1, the right wall of the sputtering chamber 1 is arranged to accommodate a viewing port or window 27 which allows passage of radiant energy from monitor control wafer 21 to infrared radiation detector 29. The output of infrared radiation detector 29 is shown connected to indicator unit 31 with the latter shown connected to recorder 33. Indicator unit 31 may, for example, comprise a voltmeter, while recorder 33 may, for example, comprise a strip recorder which provides a plot of voltage as a function of time.

In FIG. 2 there is shown an enlarged view of an exemplary monitor control wafer 21, that may typically be employed on the cathode plate 15, as shown in FIG. 1, for carrying out the principles of the present invention. Control wafer 21 thus comprises a first layer 35 and a substrate layer 37. The significant feature of the control wafer 21 resides in the fact that there exists a change in emissivity, and therefore temperature, as the process of removal passes through the layer 35 to layer 37. Since the monitor control wafer 21, in the preferred embodiment, exactly simulates the conditions prevailing on the workpieces undergoing material removal, then, when this change in temperature due to change in emissivity is sensed, it is known that the workpieces have reached their end point of material removal. In this regard, it should be noted that the monitor control wafer 21 can conveniently be made to simulate the characteristics of the workpieces by fabricating the monitor control wafer in the same fabrication run as that employed to fabricate the workpieces.

Thus, it can be seen that one of the essential requirements of the monitor control wafer 21 is that the material undergoing removal exhibit a discernable difference in emissivity than the material from which the material, undergoing removal, is removed. It can also be seen that a second requirement is that the thickness of the material undergoing removal from the monitor control wafer be accurately related to the thickness of the material desired to be removed from the workpieces. However, it should be clear that the layer 35 of material, in FIG. 2, to be removed from the monitor control wafer does not have to be of the same thickness as the layer of material on the workpieces, but merely of a thickness that corresponds to the thickness of material desired to be removed from the workpieces. Thus, where it is desired, for example, to remove 1,000 angstroms of a particular metal from a layer of that metal, several thousand angstroms thick, it is clear that all that is required is that 1,000 angstroms of this metal be used on the monitor control wafer. In this regard it should be noted that the same metal is used on the monitor control wafer as that being removed from the workpieces as a convenient way of insuring that like etch rates are involved. However, it should be clear that like materials do not necessarily have to be used where the comparative etch rates are known and, accordingly, the thickness of the layers to be removed may be adjusted in accordance therewith. Likewise, it is evident that the substrate support layer 37, in FIG. 2, of monitor control wafer 21 does not have to be the same material as the substrate support for the layers of material being sputter-etched from the various workpieces. As hereinabove indicated, all that is required of the support layer 37 is that it be of a sufficiently different emissivity than the emissivity of layer 35 so as to be discernible therefrom.

Thus, the end point detection method, in accordance with the principles of the present invention, may be employed in any of a variety of material removal processes whereby a first monitor control wafer material of one emissivity is removed from a monitor control wafer material of a second emissivity. Accordingly, layer 35 in FIG. 2 may comprise, for example, an insulator layer and layer 37 may comprise, for example, a semiconductor layer. Typically, however, layers 35 and 37 are of the same material as the corresponding layers of the workpieces undergoing material removal. Thus, layer 35, in FIG. 2, may, for example, be of the same material and same thickness as the metal undergoing removal from the workpieces 17, 19, and 23, shown generally in FIG. 1, and layer 37 may be the same type material as that of substrate supporting this metal of the workpieces.

Figure 3:
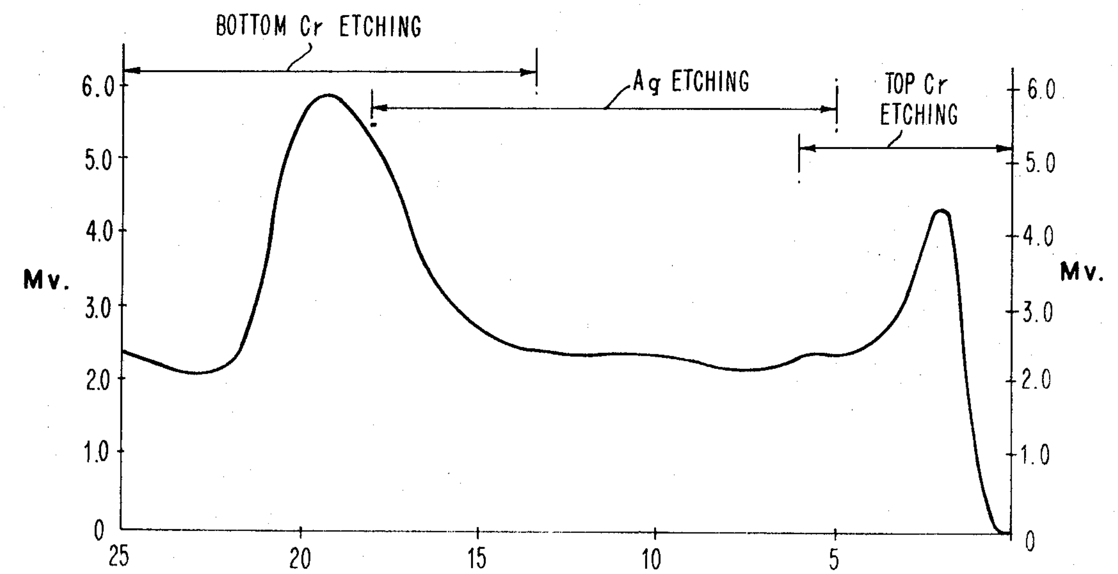
FIG. 3 shows a plot of the voltage characteristic vs. etch time for the exemplary Cr-Ag-Cr wafer, shown in FIG. 2.

An application of the method, in accordance with the principles of the present invention, to a specific exemplary material removal process, may be shown by reference to both FIGS. 2 and 3. Layer 35, in FIG. 2, may be a laminated Cr-Ag-Cr metal layer comprising a layer of chromium 39, a layer of silver 41 and a layer of chromium 43. Layer 37 may comprise a layer of silicon 45, and a layer of silicon dioxide 47 obtained, for example, by thermally oxidizing the silicon. In accordance with such a scheme, when the metal layer 35 has been removed and the silicon dioxide layer 37 reached, a change in emissivity may be detected.

In FIG. 3 there is shown a plot, taken from recorder 33 in FIG. 1, of the etch time versus voltage, in millivolts, for the Cr-Ag-Cr monitor control wafer. It is clear that the voltage of the time-versus-voltage plot is taken from infrared radiation thermometer 29, in FIG. 1, which thermometer acts to convert the radiation sensed from the Cr-Ag-Cr control wafer, as shown at 21, to voltage. The infrared radiation thermometer 29 may comprise, for example, an Ircon CH34L which has a narrow bandwidth ($3.43 \pm 0.14\mu$). The radiant energy, at this wavelength, emitted from the surface of a Cr-Ag-Cr monitor control wafer during sputtering may be transmitted, for example, through a 0.25 inch thick quartz window, as shown at 27 in FIG. 1. The transmission at $3.43\mu$ in the quartz window is approximately 90 percent.

It can be seen, by reference to the right side of the plot of FIG. 3, that as sputtering commences (at time zero) to remove chromium from the 500 angstrom chromium layer 39, shown in FIG. 2, the temperature, and therefore voltage rapidly increases. After a significant portion of the chromium layer 39 has been removed the temperature, and therefore voltage, peaks and begins to decline. During this time, the chromium layer 39 is quite thin, and possibly somewhat non-uniform, so that the 700 angstrom silver layer 41, supporting the top chromium layer 39, begins to influence the nature of the radiation emanating from the monitor wafer 21. In particular, the emissivity of silver layer 41 acts to reduce the temperature being sensed until the temperature level of the silver layer is reached. This point is reached, for the arrangement described, after approximately 6 minutes of sputter-etching, as shown in FIG. 3. After this point all of the 500 angstrom layer of chromium 39 has been removed and the full surface area of the silver layer is undergoing removal by sputter-etching.

Sputter-etching of silver layer 41 continues until about the 18 minute mark. It is to be understood that where the layer is ideally uniform the transistions from one layer to another would be manifested by a much more sharply defined change in voltage. However, since obviously the layers cannot be made ideally uniform in thickness, it is evident that a somewhat gradual change in voltage will be prevalent. Because of this non-uniformity in thickness, it can be seen that there is an overlap in the time periods during which the respective materials are removed. That is, for example, between approximately the 13 minute mark and the 18 minute mark there is still some residual silver on the supporting chromium layer 43 which is being removed, and yet, in the areas where the silver has been completely removed chromium is, accordingly, being removed.

As the chromium layer 43 is being removed, the voltage, and therefore temperature, declines toward the constant temperature level exhibited by the substrate 37, with its oxide layer 47, the substrate 37 having been placed on cathode plate 15, as shown in FIG. 1. It should be noted that, typically, when monitor control wafer 21 is merely placed on cathode plate 15 it is desirably not in good thermal contact therewith, and thus, the temperature of the wafer during sputter-etching rises above that of cathode plate 15, thereby providing a temperature range more readily detectable. In this regard it should, also, be noted that cathode plate 15 is in thermal contact with water cooled cathode 5. If sputter-etching continues at this point, the temperatures remain constant since cathode plate 15 is in thermal equilibrium. After approximately 23 minutes of sputter-etching, all three of the laminated layers 39, 41, and 43, are substantially removed and the temperature of monitor control wafer 21 commences to level off. After the voltage has smoothed out, as shown around approximately the 24 minute mark, all of the third chromium layer 43 has been removed and, accordingly, the end point of the sputter-etching removal of a correspondingly thick Cr-Ag-Cr metal layer from the substrate of workpieces, such as workpiece 17 in FIG. 1, can thereby be ascertained.

It can thus be seen that by detecting changes in the level of emissivity, given off in a sputter-etching environment when etching passes through the interface of two different materials, the end point of a sputter-etching process can be determined.

It should be recognized that the output voltage, recorded by recorder 33, may likewise be connected to detection apparatus which will automatically detect end point by sensing and analyzing the significant characteristic features in the output voltage indicative of changes in emissivity and, therefore, end point in sputter-etching.

While the invention has been particularly shown and described with reference to a preferred embodiment thereof, it will be understood by those skilled in the art that various changes in form and details may be made therein without departing from the spirit and scope of the invention.

What is claimed is:

1. A method of detecting the end point in a material removal process, comprising the steps of;
   positioning a monitoring wafer, comprising at least a support layer of one material supporting a top layer of another material, in the material removal environment of said material removal process, along with the workpiece undergoing material removal, so that said material removal process acts to remove said top layer;
   sensing the radiation given off by said monitoring wafer during said material removal process; and
   detecting said end point by discerning the change in radiation exhibited by said monitoring wafer when said top layer is removed, the time required to etch said top layer corresponding to the time required to etch the desired amount in said workpiece.

2. The method as set forth in claim 1 wherein said top layer is formed during the same processing run used to fabricate the layer on said workpiece which is undergoing selective material removal.

3. The method as set forth in claim 2 wherein said material removal process comprises a sputter-etching process.

4. The method as set forth in claim 3 wherein said top layer and said layer undergoing material removal on said workpiece are made of metal.

5. The method as set forth in claim 4 wherein said support layer supporting said top layer is made of an insulator material.

6. The method as set forth in claim 5 wherein said metal is Cr-Ag-Cr and said insulator material is $SiO_2$.

7. The method as set forth in claim 6 wherein said workpiece comprises a silicon substrate supporting said Cr-Ag-Cr layer of metal.

8. The method as set forth in claim 7 wherein the said Cr-Ag-Cr layer of metal on said substrate is etched to form metal lands of Cr-Ag-Cr, electrically isolated from one another.

9. A method of detecting the end point in a sputter-etching process, comprising the steps of;
   fabricating a monitor control wafer of at least two layers from respective materials having a discernable difference in emissivity while undergoing sputter-etching;
   positioning said monitor control wafer in the sputter-etching chamber along with the workpiece which is to undergo sputter-etching; and
   sensing the radiation given off by said monitor control wafer during sputter-etching to thereby ascertain when ones of said layers have been removed.

10. The method as set forth in claim 9 wherein the thickness of the top layer of said at least two layers exposed to sputter-etching is selected so that the time required to etch therethrough corresponds to the time required to produce the desired degree of etching of said workpiece.

11. The method as set forth in claim 10 wherein said top layer is formed during the same processing run used to fabricate the layer to be etched on said workpiece.

12. The method as set forth in claim 11 wherein said top layer and said layer to be etched on said workpiece are made of metal.

13. The method as set forth in claim 12 wherein the layer supporting said top layer is made of an insulator material.

14. The method as set forth in claim 13 wherein said metal is Cr-Ag-Cr and said insulator is $SiO_2$.

15. The method as set forth in claim 14 wherein said workpiece comprises a silicon substrate supporting said Cr-Ag-Cr layer of metal.

16. The method as set forth in claim 15 wherein the said Cr-Ag-Cr layer of metal on said substrate is etched to form metal lands of Cr-Ag-Cr, electrically isolated from one another.

17. A method of detecting the end point in the removal of a first type of material previously deposited on a substrate of a second type material, comprising the steps of:
   fabricating a control piece by exposing a piece of said second type material to the same process used to deposit said first type material on said substrate so as to thereby deposit in the same manner said first type material on said control piece;
   exposing said control piece with deposited first type material to the same removal process used to remove said first type material from said substrate;
   sensing the emissivity of said control piece as said first type material is removed therefrom to thereby detect when all of said first type material is removed, thus indicating that all of said first type material is removed from said substrate.

18. A method of detecting the end point in a material removal process comprising the steps of:
   fabricating a monitoring wafer by selecting a first type material as a support layer and a second type material, having a discernable difference in emmisivity than said first type material, as the layer to be supported by said support layer, said second layer having a thickness sufficient such that the time required for the removal thereof corresponds to said end point;
   exposing said monitoring wafer to said material removal process; and
   monitoring the radiation emitted by said monitoring wafer during said material removal process.

19. A method of detecting the end point in removing material from a workpiece, comprising the steps of, fabricating a monitoring wafer to undergo material removal by forming a support layer from a selected first material of given emissivity and forming a second supported layer from a selected second material having an emissivity discernably different from the emissivity of said first material, said second layer made to have a thickness sufficient such that the time required for the removal thereof corresponds to the time required to provide the desired degree of material removal from said workpiece.

20. A detection system for detecting the end point of material removal from a workpiece in the removal chamber of a material removing apparatus, comprising;

radiation producing means positioned within said chamber, said radiation producing means including a layer of first material of one emissivity and a layer of second material, supported by said layer of first material, of a second emissivity discernible from said first emissivity, said layer of second material having a thickness sufficient so that the time required for the removal thereof from said layer of first material corresponds to the time required to provide the desired degree of material removal from said workpiece;

sensing means responsive to sense the radiation emitted by said radiation producing means; and indicating means coupled to said sensing means to indicate the change in emissivity sensed by said sensing means when said layer of second material has been removed from said layer of first material.

21. The system as set forth in claim 20 wherein said material removal apparatus is a sputter-etching arrangement.

22. The system as set forth in claim 21 wherein said sensing means is an infrared sensing means positioned outside of said chamber.

23. The system as set forth in claim 22 wherein the material to be removed from said workpiece is the same as the said second material of said radiation producing means.

24. The system as set forth in claim 23 wherein the thickness of the layer of said second material to be removed from said layer of first material means corresponds to the thickness of the layer of material to be removed from said workpiece.

25. In a sputter-etching system, including a sputter-etching chamber for holding a workpiece to be sputter-etched, the improvement comprising;

radiation producing means positioned within said chamber with said workpiece, said radiation producing means including a layer of first material of one emissivity and a layer of second material, supported by said layer of first material, of a second emissivity, discernible from said first emissivity, said layer of second material having a thickness sufficient so that the time required for etching therethrough corresponds to the time required to provide the desired degree of etching in said workpiece;

infrared sensing means positioned external to said chamber and responsive to sense the radiation emitted by said radiation producing means; and indicating means coupled to said infrared sensing means to indicate the change in emissivity sensed by said sensing means when said layer of second material has been removed from said layer of first material.

26. The system as set forth in claim 25 wherein the material to be removed from said workpiece is the same as the said second material of said radiation producing means.

27. The system as set forth in claim 26 wherein the thickness of the layer of said second material to be removed from said layer of first material corresponds to the thickness of the layer of material to be removed from said workpiece.

* * * * *